(12) United States Patent
Fung

(10) Patent No.: US 7,116,601 B2
(45) Date of Patent: Oct. 3, 2006

(54) PSEUDO-SYNCHRONIZATION OF THE TRANSPORTATION OF DATA ACROSS ASYNCHRONOUS CLOCK DOMAINS

(75) Inventor: Hon Chung Fung, Flower Mound, TX (US)

(73) Assignee: VIA Technologies, Inc., Taipei (TW)

( * ) Notice: Subject to any disclaimer, the term of this patent is extended or adjusted under 35 U.S.C. 154(b) by 78 days.

(21) Appl. No.: 11/024,351

(22) Filed: Dec. 28, 2004

(65) Prior Publication Data
US 2006/0164902 A1 Jul. 27, 2006

(51) Int. Cl.
*G11C 7/00* (2006.01)
(52) U.S. Cl. ........................ 365/221; 365/198; 365/194; 711/167; 713/400; 713/600
(58) Field of Classification Search ............... 365/221, 365/198, 194, 233; 711/167; 713/400, 600
See application file for complete search history.

(56) References Cited

U.S. PATENT DOCUMENTS

| 6,845,436 B1 * | 1/2005 | Wu ............................ 711/167 |
| 6,907,538 B1 * | 6/2005 | Boutaud ...................... 713/400 |
| 2006/0067141 A1 * | 3/2006 | Perego et al. .............. 365/200 |

\* cited by examiner

*Primary Examiner*—Richard Elms
*Assistant Examiner*—Toan Le
(74) *Attorney, Agent, or Firm*—Thomas, Kayden, Horstemeyer & Risley

(57) ABSTRACT

A pseudo-synchronous temporary storage element transports data between two system blocks with different clock systems by pseudo-synchronizing the clock edges of the two clock signals. The pseudo-synchronization circuit may be an integral part of a storage element, a separate pseudo-synchronization device, or a discrete add-on circuit to an off the shelf storage element device.

19 Claims, 5 Drawing Sheets

PSEUDO-SYNCHRONIZATION OF THE TRANSPORTATION OF DATA ACROSS ASYNCHRONOUS CLOCK DOMAINS

TECHNICAL FIELD

The present disclosure is generally related to electronic circuits and, more particularly, is related to systems and methods for pseudo-synchronizing the transportation of data across asynchronous clock domains.

BACKGROUND OF THE DISCLOSURE

A FIFO is a first in, first out, temporary data storage device. It is useful for sharing data between real-time tasks and user-level applications. A FIFO is often used to connect a non-real-time machine interface to a real-time application (e.g. to log messages to disk files).

A FIFO in its simplest form is a queue of raw storage units. Typically, fixed-size data structures are written to a FIFO, so that a device reading the data is not burdened with message boundaries. The queued nature of a FIFO makes it best suited for ordered streams of data such as: messages or error diagnostics where the message can include a timestamp for later analysis; data logs for performance metrics; and configuration information at system start-up, among others.

A FIFO, on a higher level, is an array of registers that stores data. The data is often read from and written to devices with different clock domains. The conventional way to transfer data in different clock domains is to synchronize the read and write clocks in the control logic. However, when the read control signal and the write control signal are synchronized, penalties are incurred in the form of delays. The read and write blocks, which are sharing the data, are often clocked at different frequencies, which introduces unwanted delays in the transfer of data between the blocks.

The delays are normally incurred in the control circuit. The control circuit involves the FIFO write control signal and FIFO read control signal. Based on the read and write control signals, a status signal is produced, such as non-limiting examples of FIFO empty or FIFO full. An overflow signal is another status signal, but it is more like an error condition. A status signal can be used to control the transfer of data.

A delay is incurred when the read control signal is synchronized with the write control signal. The read signal is processed some number of clocks later than the write signal. Since the write signal fills the FIFO faster than the read signal can empty it, some delay is incurred.

Thus, a heretofore unaddressed need exists in the industry to address the aforementioned deficiencies and inadequacies.

SUMMARY OF THE DISCLOSURE

Embodiments of the present disclosure provide systems and methods for pseudo-synchronization of the transportation of data across asynchronous clock domains. Briefly described, in architecture, one embodiment of the system, among others, can be implemented as follows. A method of transporting data between a first device operating at a first frequency and a second device operating at a second frequency can be achieved by pseudo-synchronizing an enable signal from the first device with an enable signal from the second device such that the pseudo-synchronized enable signals can be captured by logic elements operating at either of the first and second clock frequencies; reading data enabled by a first pseudo-synchronized enable signal from a first device into a temporary storage element; and writing data from the temporary storage element to a second device enabled by a second pseudo-synchronized enable signal; wherein one of the first and second frequency is an integral multiple of the other of the first and second frequency.

A temporary storage system for transporting data between a first device with a first clock frequency and a second device with a second clock frequency can be achieved with a temporary storage element; an input on the temporary storage element to read data into the temporary storage element from a first device; an output on the temporary storage element to write data out of the temporary storage element to a second device; a plurality of memory locations in the temporary storage element to store the data read into and written out of the temporary storage element; a read clock input on the temporary storage element for receiving a read clock with frequency of first device; a write clock input on the temporary storage element for receiving a write clock with a frequency of the second device; read enable input in the temporary storage element for receiving a read enable signal; a write enable input in the temporary storage element for receiving a write enable signal; and a pseudo-synchronization circuit to pseudo-synchronize the write enable signal and the read enable signal such that the pseudo-synchronized enable signals can be captured by logic elements operating at either of the first or second clock frequencies; wherein the frequency of one of the write clock and read clock is an integral multiple of the other of the write clock and read clock.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Disclosed herein are systems and methods for pseudo-synchronous data transfer. To facilitate description of the inventive systems, example systems that can be used to implement the systems and methods for pseudo-synchronous data transfer are discussed with reference to the figures. Although these systems are described in detail, it will be appreciated that these systems are provided for purposes of illustration only and modifications are feasible without departing from the inventive concept.

Referring now and in more detail to the drawings in which like numerals indicate corresponding parts through the several views, this disclosure describes pseudo-synchronous data transfer. It describes how the system is configured and how it operates.

Figure 1:
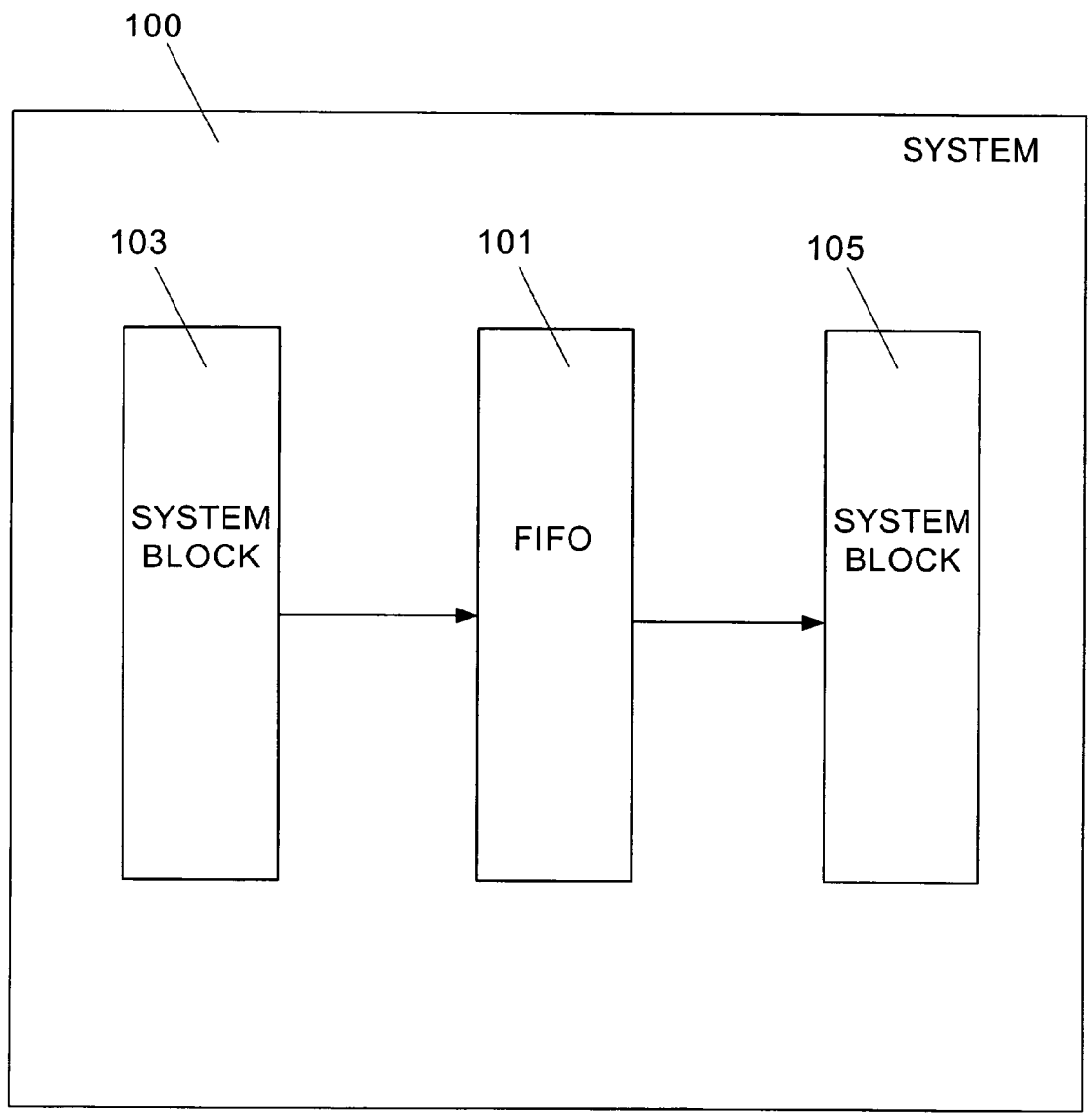
FIG. 1 is a system block diagram of a system with a FIFO.

A system level block diagram 100 is provided in FIG. 1. FIFO 101 is used to transport data between system block 103 and system block 105. System blocks 103, 105 operate at different frequencies. The frequencies of a preferred embodiment of a pseudo-synchronous FIFO are integral multiples. For instance, the clock of block 103 may be 6 MHz and the clock of block 105 may be 3 MHz. FIFO 101 of FIG. 1 is shown in detail in FIGS. 2, 3, and 4.

To avoid a delay in reading data from the FIFO, the pseudo-synchronization circuit pseudo-synchronizes the write enable and read enable signals such that they can be captured by logic elements operating at either one of the clock frequency domains. Synchronous signals switch at the same periodic frequency. Asynchronous signals switch with no periodic frequency. Pseudo-synchronous signals switch at different frequencies, but the rising edges of one of the signals occurs substantially simultaneously with a rising edge of the other signal. It is important to have the read and write clocks from the two different domains to be multiples of one another as a system design constraint so that none of the clock periods are lost. For example, a FIFO for data transfer between two system blocks may have different read and write frequencies, but the frequencies have an integral multiple relationship.

Figure 2:
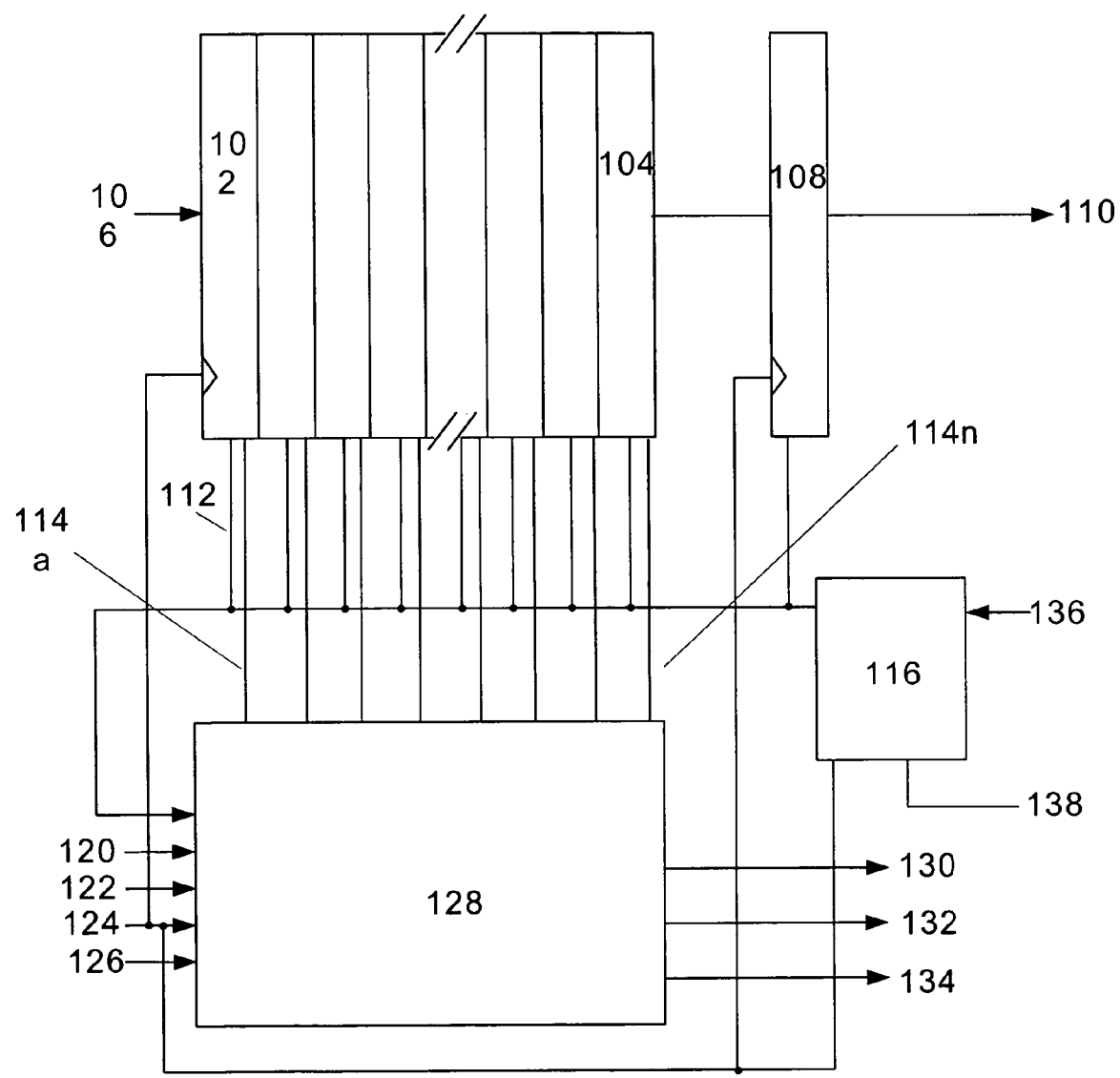
FIG. 2 is a circuit block diagram of an exemplary embodiment of a FIFO.

A basic block diagram of the pseudo-synchronous FIFO 101 is provided in FIG. 2. FIG. 2 is a block diagram of an exemplary embodiment of FIFO 101. Registers 102–104 are slice registers in a FIFO stack. Data signal 106 is the data input signal into the data registers 102–104. Register 108 is the output register for the output of data from the FIFO on signal line 110. Signal line 112 is the pseudo-synchronous read enable signal in clock A domain. This is the same signal as signal 220, which is the output from pseudo-synchronization block 116 shown in detail in FIG. 3. Signals 114a–114n are write signals from control block 128 which is shown in detail in FIG. 4.

Write enable signal 120, threshold signal 122, write clock (clock A) 124, and reset signal 126 are all inputs to control block 128. FIFO empty signal 130, overflow signal 132, and below-threshold signal 134 are outputs from control block 128 for data level indication. FIFO read enable signal 136 and read clock (clock B) 138 are inputs to block 116.

When the write enable signal is active at the rising edge of clock A (write clock), a write signal among 114a–114n will be active and the input data 106 will be written into one of the empty slice of the data registers 102–104. The write pointer inside the control logic 128 will increment and point to the next available slice for the next write. When the read enable signal 136 is active at the rising edge of clock B (read clock), an internal read enable signal 112 is generated and it is pseudo-synchronized to the clock A domain. This internal read enable signal causes the data in register 104 to shift into output register 108, and all other data inside the slice registers to shift towards register 104 by one position. The internal read enable signal also decrements the write pointer of control logic 128 as an empty space is created in the slice registers after the read.

Figure 3:
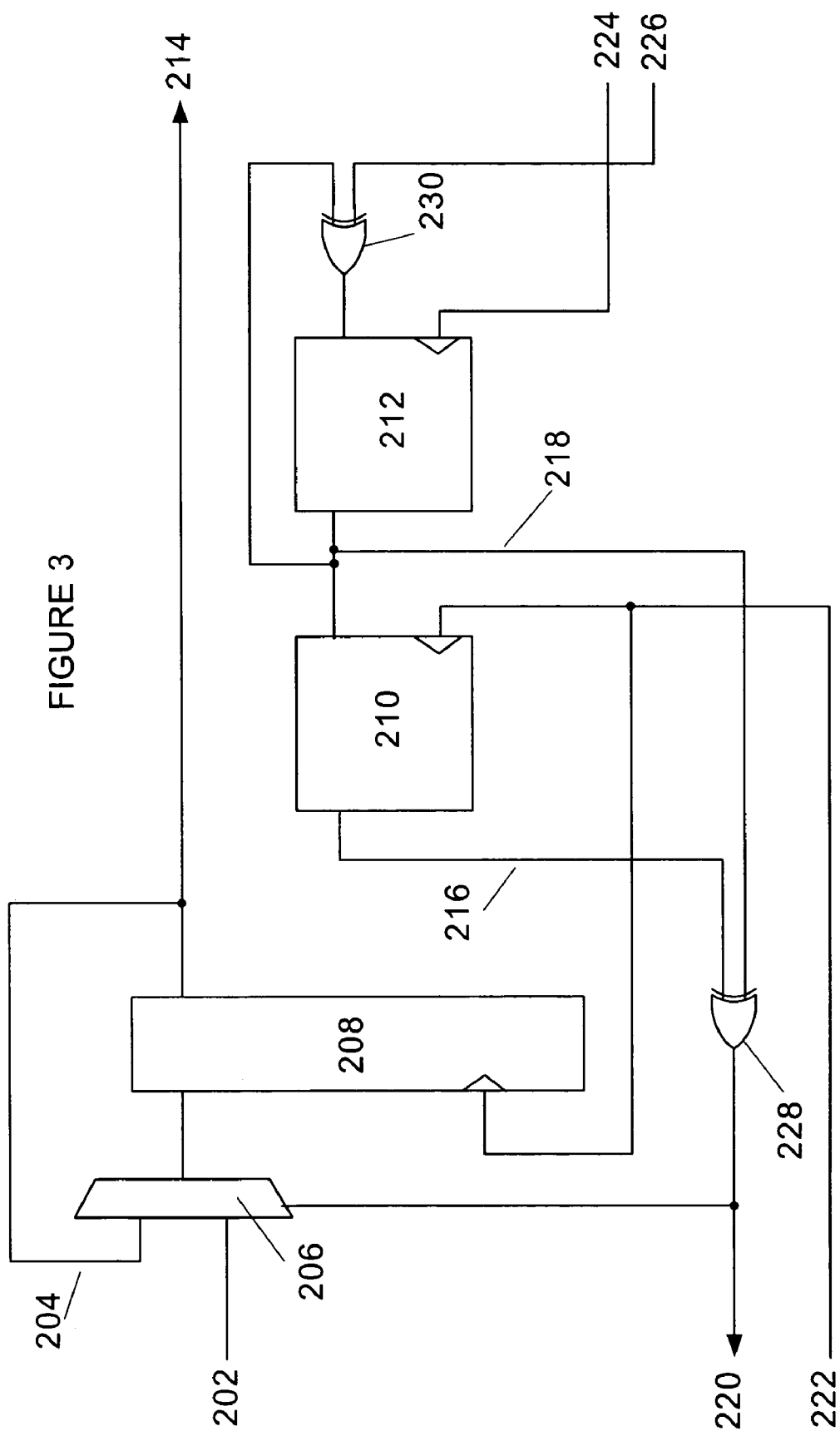
FIG. 3 is a circuit block diagram of an exemplary embodiment of a FIFO output register and the pseudo-synchronization block of the FIFO of FIG. 2.

In an exemplary embodiment of a pseudo-synchronization block 116 provided in FIG. 3, the pseudo-synchronization block includes elements 210, 212, 228, and 230. A data slice to be transported between two system blocks comes into multiplexer 206 and is passed to output register 208. The data is output on line 214. The output register is clocked with the write clock (clock A) 222.

The pseudo-synchronization of the read enable signal 226 to the clock A 222 domain, is performed with D flip-flop 210, D flip flop 212, exclusive OR 230, and exclusive OR 228. D-type flip-flops or any edge triggered flip-flops configured as D-type flip-flops with appropriate logic elements can be used for elements 210 and 212. Clock B 224 is fed into the clock input of D flip-flop 212, while clock A 222 is fed into the clock input of D flip-flop 210. The output of D flip-flop 212 and the FIFO read signal 226 are fed into exclusive OR 230 which is fed to the input of D flip-flop 212. The output of D flip-flop 212 is fed to the input of D flip-flop 210. The output of D flip-flop 210 and D flip-flop 212 are fed into exclusive OR 228 to produce a pseudo-synchronized synchronized read enable signal 220 in clock A domain. This embodiment is functional when clock B is at a lower frequency compared to clock A. However, as one of ordinary skill in the art would appreciate, a similar circuit can be derived and applied such that the FIFO will operate properly if clock B is the higher frequency.

Figure 4:
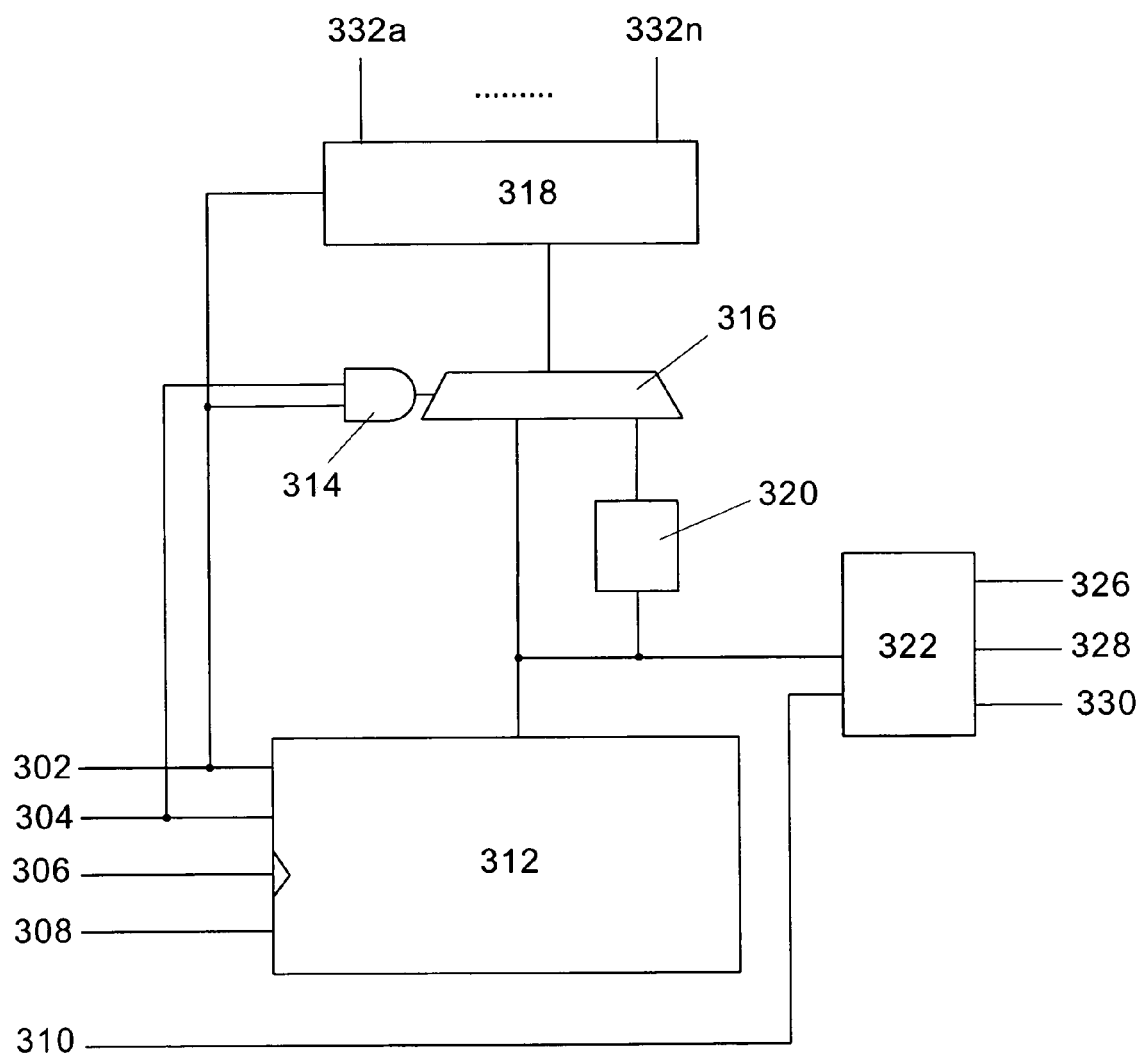
FIG. 4 is a circuit block diagram of an exemplary embodiment of control logic of the FIFO of FIG. 2.

In an exemplary embodiment, counter 312 of FIG. 4 runs at a single frequency, is incremented by write signal 302, and is decremented by read signal 304. The pseudo-synchronization logic receives the FIFO read enable signal 226 which is in the clock B domain and pseudo-synchronizes it to produce a FIFO read enable signal 220 in the clock A domain. This signal 220 drives counter 312 in FIG. 4, which is an up/down counter to count how much data is in the FIFO. Whenever data is written into the FIFO, counter 312 increments by one. When data is read, it decrements by one. If the counter is zero, then the FIFO is empty. If it is three, then there are three registers of data in the FIFO. The higher frequency, which is clock A, the write frequency in this exemplary embodiment, is chosen as the master clock.

FIG. 4 is an exemplary embodiment of control logic 128 of the FIFO of FIG. 2. Signal 302 is the write signal, which is fed into the up/down counter 312 to increment counter 312. Signal 304 is the read enable signal in the clock A domain, also signal 220 in FIG. 3, which is fed into counter 312 to decrement counter 312. Signal 306 is clock A, the write clock, which is the master clock for the FIFO. Signal 308 is a reset signal, which is used to reset the counter upon power up. Signal 310 is a threshold signal, which sets the threshold for the empty/overflow signals.

Up/down counter 312 is used for data level indication. AND gate 314 accepts read enable signal 304 in clock A domain and write enable signal 302. The output of AND gate 314 selects the input for multiplexer 316. The output of the multiplexer 316 is fed into decoder 318, which is enabled by write signal 302. The outputs of 332a–332n of decoder 318 are fed into FIFO registers 102–104 of FIG. 2. Element 320 is a decrementer. Element 322 is a decoder for the data level indicator signals.

Figure 5:
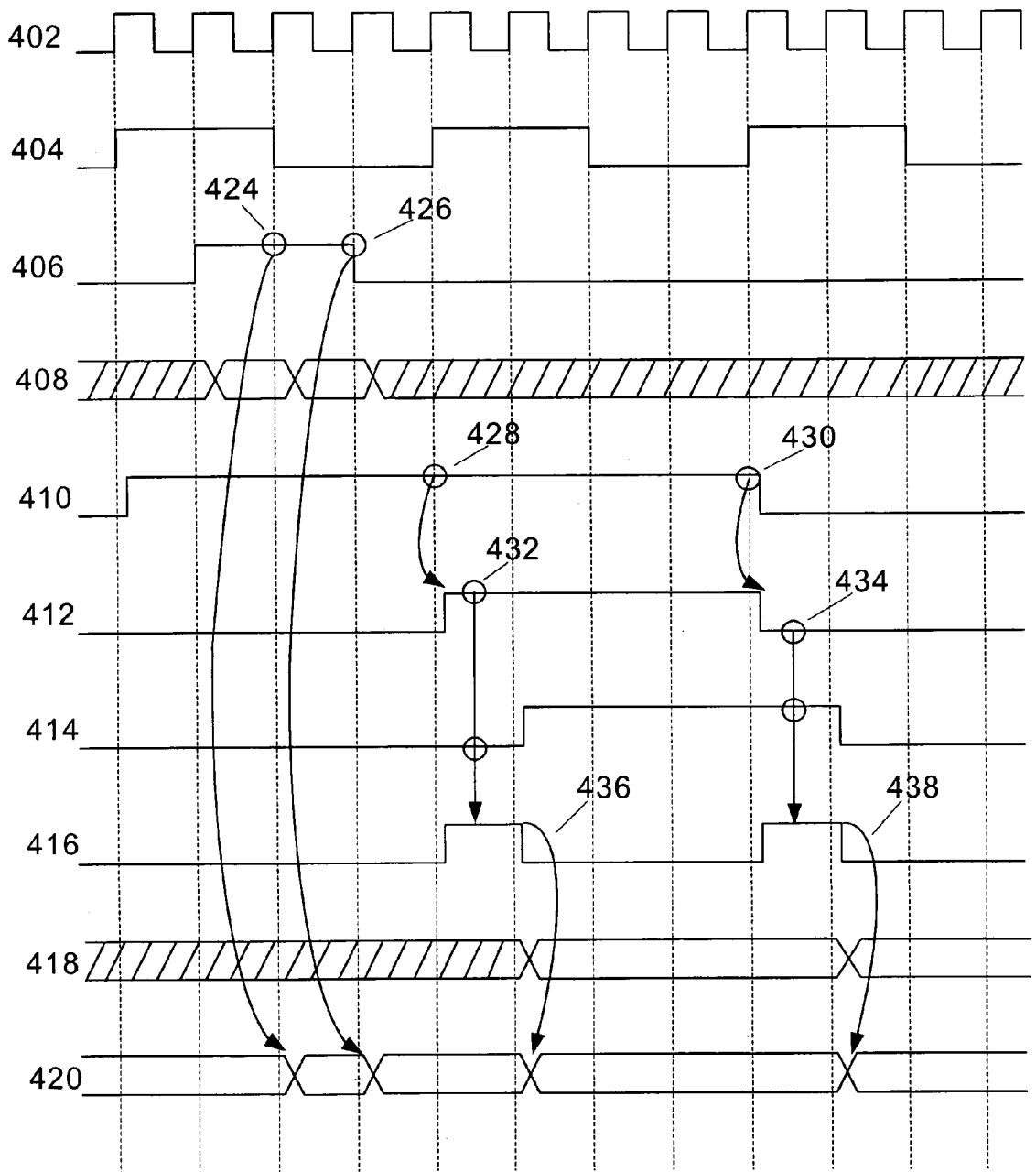
FIG. 5 is a timing diagram of the FIFO of FIG. 2.

The operation of an exemplary embodiment of the pseudo-synchronization circuit of FIG. 3 is now described in detail, using the timing diagram of FIG. 5. Signal 402 is clock A, the write clock; signal 404 is clock B, the read clock; signal 406 is the FIFO write enable signal; signal 408 is the data input signal; signal 410 is the FIFO read enable signal; signal 412 is the read count signal; signal 414 is the read count delay signal; signal 416 is the pseudo-synchronized read enable signal; signal 418 is the data output signal; and signal 420 is the output of the up/down counter.

If read enable signal 410 is high at the rising edge of read clock 404, data is read from the FIFO. Two reads are shown at points 428, 430. Each read causes a transition in read count signal 412 on the rising edge of clock B 404, the read clock.

Clock A 402 feeds into the output register 208 of FIG. 3. Since the clock of flip flop 210 is clock A, the output of flip flop 210 delays the input signal by one clock A cycle as shown in signal 414 in FIG. 5. Then the input and output of flip-flop 210 are fed to exclusive OR 228 such that whenever they are different logic states (as shown at points 432, 434), the output signal 220, the pseudo-synchronized read enable signal, also shown as signal 416 in FIG. 5, goes high. When they are the same, output 220 goes low. Signal 416 is a single cycle pulse whenever read enable 410 is high at the rising edge of clock B 404.

The pulse signal 416, which is also 304 in FIG. 4, is fed into up/down counter 312 to decrement the counter. The counter is decremented one clock A cycle after a read occurs. The write control signal 302 for incrementing the counter 312 operates like a write control signal in a synchronous FIFO that reads and writes at the same clock frequency. This exemplary embodiment of pseudo-synchronization logic translates a read signal with one read clock frequency into another signal which is pseudo-synchronous to the higher frequency write clock. Delays are limited to the delays of a synchronous FIFO with a single read/write frequency.

The exemplary embodiment involves a pseudo-synchronization circuit integrated in a temporary storage device. However, as one skilled in the art would realize, the pseudo-synchronization circuit could be used with many commercially available asynchronous FIFOs. The circuit could be integrated on one device separate from the FIFO or broken into a plurality of devices, even down to a discrete level. Additionally, although exemplary embodiments are provided with FIFOs, as one of ordinary skill in the art would realize, the pseudo-synchronization circuit would also apply to other storage elements.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

Therefore, having thus described the disclosure, the following is claimed:

1. A method of transporting data between a first device operating at a first frequency and a second device operating at a second frequency comprising:
   pseudo-synchronizing an enable signal from the first device with an enable signal from the second device such that the pseudo-synchronized enable signals can be captured by logic elements operating at either of the first and second clock frequencies;
   reading data enabled by a first pseudo-synchronized enable signal from a first device into a temporary storage element; and
   writing data from the temporary storage element to a second device enabled by a second pseudo-synchronized enable signal.

2. The method of claim 1, wherein the temporary storage element is a FIFO.

3. A temporary storage system for transporting data between a first device with a first clock frequency and a second device with a second clock frequency comprising:
   a temporary storage element;
   an input on the temporary storage element to read data into the temporary storage element from a first device;
   an output on the temporary storage element to write data out of the temporary storage element to a second device;
   a plurality of memory locations in the temporary storage element to store the data read into and written out of the temporary storage element;
   a read clock input on the temporary storage element for receiving a read clock with frequency of first device;
   a write clock input on the temporary storage element for receiving a write clock with a frequency of the second device;
   a read enable input in the temporary storage element for receiving a read enable signal;
   a write enable input in the temporary storage element for receiving a write enable signal; and
   a pseudo-synchronization circuit to pseudo-synchronize the write enable signal and the read enable signal such that the pseudo-synchronized enable signals can be captured by logic elements operating at either of the first or second clock frequencies.

4. The system of claim 3, wherein the temporary storage element is a FIFO.

5. The temporary storage system of claim 3, wherein the pseudo-synchronization circuit comprises:
   a first logic gate;
   a second logic gate communicatively coupled to the first logic gate;
   a third logic gate communicatively coupled to the second logic gate;
   a fourth logic gate communicatively coupled to the third logic gate.

6. The temporary storage system of claim 5, wherein the pseudo-synchronization circuit further comprises
   a first clock input communicatively coupled to second logic gate;
   a second clock input communicatively coupled to the third logic gate; and
   a control signal input communicatively coupled to the fourth logic gate.

7. The temporary storage system of claim 6, wherein
   the first clock is one of the read clock and the write clock;
   the second clock is the other of the read clock and the write clock; and
   the control signal input is chosen as one of a read control signal and a write control signal.

8. The temporary storage system of claim 7, wherein the choice for the control signal input corresponds to the faster of the read clock frequency and the write clock frequency.

9. The temporary storage system of claim 3, wherein the pseudo-synchronization circuit comprises:
   a first exclusive OR gate;
   a first flip-flop communicatively coupled to the first exclusive OR gate;
   a second flip-flop communicatively coupled to the first flip-flop; and
   a second exclusive OR gate communicatively coupled to the second flip-flop.

10. The temporary storage system of claim 9, wherein the pseudo-synchronization circuit further comprises
   a first clock input communicatively coupled to the first flip flop;

a second clock input communicatively coupled to the second flip flop; and a control signal input communicatively coupled to the second exclusive OR gate.

11. The temporary storage system of claim 10, wherein
the first clock input receives one of the read clock and the write clock;
the second clock input receives the other of the read clock and the write clock; and
the control signal input receives one of the read control signal and the write control signal.

12. The temporary storage system of claim 11, wherein the received control signal input corresponds to the faster of the read clock frequency and the write clock frequency.

13. The temporary storage system of claim 9, wherein the first flip flop and second flip flop are D-type flip flops.

14. A temporary storage system for transporting data between a first device and a second device with corresponding first clock frequency and second clock frequency comprising:

means for pseudo-synchronizing an enable signal from the first device with an enable signal from the second device such that the pseudo-synchronized enable signals can be captured by logic elements operating at either of the first and second clock frequencies;

means for reading data enabled by a first pseudo-synchronized enable signal from the first device into a temporary storage element; and means for writing data from the temporary storage element to the second device enabled by a second pseudo-synchronized enable signal.

15. The system of claim 14, wherein the temporary storage element is a FIFO.

16. A pseudo-synchronization circuit comprising:

a first exclusive OR gate;

a first flip-flop communicatively coupled to the first exclusive OR gate;

a second flip-flop communicatively coupled to the first flip-flop;

a second exclusive OR gate communicatively coupled to the second flip-flop;

a first clock input communicatively coupled to the first flip flop;

a second clock input communicatively coupled to the second flip flop; and a control signal input communicatively coupled to the second exclusive OR gate.

17. The circuit of claim 16, wherein
the first clock input receives one of a read clock and a write clock;
the second clock input receives the other of the read clock and the write clock; and
the control signal input receives one of a read control signal and a write control signal.

18. The circuit of claim 17, wherein the received control signal input corresponds to the faster of the read clock frequency and the write clock frequency.

19. The circuit of claim 16, wherein the first flip flop and second flip flop are D-type flip flops.

* * * * *